United States Patent
Zhao et al.

(10) Patent No.: US 12,294,444 B2
(45) Date of Patent: May 6, 2025

(54) METHOD, TERMINAL DEVICE, AND NETWORK DEVICE FOR COMMUNICATION

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

(*) Notice: Subject to any disclaimer, the term of this patent is extended or adjusted under 35 U.S.C. 154(b) by 0 days.

(21) Appl. No.: 18/664,231

(22) Filed: May 14, 2024

(65) Prior Publication Data

US 2024/0421895 A1 Dec. 19, 2024

Related U.S. Application Data

(63) Continuation of application No. PCT/CN2023/100970, filed on Jun. 19, 2023.

(51) Int. Cl.
- H04B 7/185 (2006.01)
- H04W 36/08 (2009.01)
- H04W 74/08 (2024.01)
- H04W 74/0833 (2024.01)

(52) U.S. Cl.
CPC ....... H04B 7/18541 (2013.01); H04B 7/1855 (2013.01); H04W 74/0833 (2013.01)

(58) Field of Classification Search
None
See application file for complete search history.

(56) References Cited

U.S. PATENT DOCUMENTS

| | | | | |
|---|---|---|---|---|
| 2016/0323800 A1* | 11/2016 | Ulupinar | ............... | H04W 36/32 |
| 2023/0262687 A1* | 8/2023 | Sayed Hassan | ...... | H04W 36/06 |
| | | | | 370/331 |
| 2023/0361937 A1* | 11/2023 | Shrivastava | .......... | H04L 1/1887 |
| 2024/0235664 A1* | 7/2024 | Ji | ..................... | H04W 36/0072 |

FOREIGN PATENT DOCUMENTS

| | | | |
|---|---|---|---|
| CN | 108112281 | | 6/2018 |
| CN | 110493833 | | 11/2019 |
| CN | 111525950 | | 8/2020 |
| CN | 111756454 | | 10/2020 |
| CN | 113079546 | | 7/2021 |
| WO | WO 2021196769 | | 10/2021 |
| WO | WO-2024171051 A1 * | 8/2024 | ........... H04B 7/1851 |

OTHER PUBLICATIONS

International Search Report and Written Opinion in International Appln. No. PCT/CN2023/100970, mailed on Feb. 27, 2024, 18 pages (with English machine translation).

* cited by examiner

*Primary Examiner* — Scott M Sciacca
(74) *Attorney, Agent, or Firm* — Fish & Richardson P.C.

(57) ABSTRACT

A method, a terminal device, and a network device for communication are provided. One example method comprises: performing a third operation in response to a change of a satellite corresponding to a first cell for the terminal device, wherein the change comprises a change from a first satellite to a second satellite.

18 Claims, 8 Drawing Sheets

METHOD, TERMINAL DEVICE, AND NETWORK DEVICE FOR COMMUNICATION

CROSS-REFERENCE TO RELATED APPLICATIONS

This application is a continuation of International Application No. PCT/CN2023/100970, filed on Jun. 19, 2023, the disclosure of which is hereby incorporated by reference in its entirety.

TECHNICAL FIELD

The various embodiments described in the present disclosure relate in general to the field of communication technology, and more specifically to a method, a terminal device, and a network device for communication.

BACKGROUND

With the development of technology, non-terrestrial network (NTN) communication emerges correspondingly. The NTN communication can be implemented based on a satellite or other non-terrestrial communication devices. Therefore, in some embodiments, the NTN communication may also be referred to as satellite communication. Since a satellite may move, even if a terminal device does not move, the satellites serving the terminal device may change. The related technology of how the terminal device should respond to the change of satellites in some cases has not been proposed yet.

SUMMARY

The present disclosure provides a method, a terminal device, and a network device for communication. Various aspects of the present disclosure are described below.

In the first aspect, a method for communication is provided, including: performing, by a terminal device, a first operation according to a first moment. The first moment refers to a moment of a change of a satellite corresponding to a first cell for the terminal device. The first operation includes one or more of the following operations: a second operation performed by the terminal device after the terminal device starts to use ephemeris information of a changed satellite; and a third operation performed by the terminal device in response to the change of the satellite corresponding to the first cell.

In a second aspect, a method for communication is provided, including: determining, by a network device, a first moment, where the first moment refers to a moment of a change of a satellite corresponding to a first cell for a terminal device; and configuring, by the network device, one or more of the following information according to the first moment: ephemeris information of a changed satellite, and a first operation performed by the terminal device according to the first moment. The first operation includes one or more of the following operations: a second operation performed by the terminal device after the terminal device starts to use ephemeris information of the changed satellite; and a third operation performed by the terminal device in response to the change of the satellite corresponding to the first cell.

In a third aspect, a terminal device is provided, including: a performing unit configured to perform a first operation according to a first moment. The first moment refers to a moment of a change of a satellite corresponding to a first cell for the terminal device, and the first operation includes one or more of the following operations: a second operation performed by the terminal device after the terminal device starts to use ephemeris information of a changed satellite; and a third operation performed by the terminal device in response to the change of the satellite corresponding to the first cell.

In a fourth aspect, a network device is provided, including: a determining unit configured to determine a first moment, where the first moment refers to a moment of a change of a satellite corresponding to a first cell for a terminal device; and a configuration unit configured to configure one or more of the following information according to the first moment: ephemeris information of a changed satellite, and a first operation performed by the terminal device according to the first moment. The first operation includes one or more of the following operations: a second operation performed by the terminal device after the terminal device starts to use ephemeris information of the changed satellite; and a third operation performed by the terminal device in response to the change of the satellite corresponding to the first cell.

In a fifth aspect, a terminal device is provided, including a memory and at least one processor. The memory is configured to store one or more computer programs, and the at least one processor is configured to call the one or more computer programs in the memory to cause the terminal device to perform part of or all operations of the method for communication according to the first aspect.

In a sixth aspect, a network device is provided, including a memory, at least one processor and a transceiver. The memory is configured to store one or more computer programs, and the at least one processor is configured to call the one or more computer programs in the memory to cause the network device to perform part of or all operations of the method for communication according to the second aspect.

In a seventh aspect, a system for communication is provided, including the above terminal device and/or the above network device. In some embodiments, the system may further include other devices interacting with the terminal device or the network device in the technical solutions provided in the embodiments of the present disclosure.

In an eighth aspect, a computer-readable storage medium is provided. The computer-readable storage medium is configured to store computer programs, which, when being executed by one or more processors, cause the terminal device and/or the network device to perform part of or all operations of the methods for communication according to the above various aspects.

In a ninth aspect, a computer program product is provided, including a non-transitory computer-readable storage medium storing computer programs, which are executable by one or more processors to cause the terminal device and/or the network device to perform part of or all operations of the method for communication according to the above various aspects. In some embodiments, the computer program product may be a software package.

In a tenth aspect, a chip is provided, including a memory and at least one processor. The at least one processor is configured to call and run computer programs from the memory, in order to implement part of or all operations of the methods for communication according to the above various aspects.

In the present disclosure, the terminal device can perform the first operation to correspond to the change of the satellite. For example, the first operation includes the operation performed by the terminal device after the terminal device starts to use the ephemeris information of the changed satellite (i.e., the second operation), the terminal device can determine the moment from which the terminal device starts to use the ephemeris information of the changed satellite based on the moment of change of the satellite, such that the use of ephemeris information can be more in line with actual conditions. As another example, the first operation includes the operation performed by the terminal device in response to the change of the satellite (i.e., the third operation), with the third operation, the terminal device can prevent communication anomalies caused by the change of the satellite as much as possible.

DETAILED DESCRIPTION OF THE EMBODIMENTS

The technical solutions in the present disclosure will be described below in conjunction with the accompanying drawings.

Communication System

Figure 1:
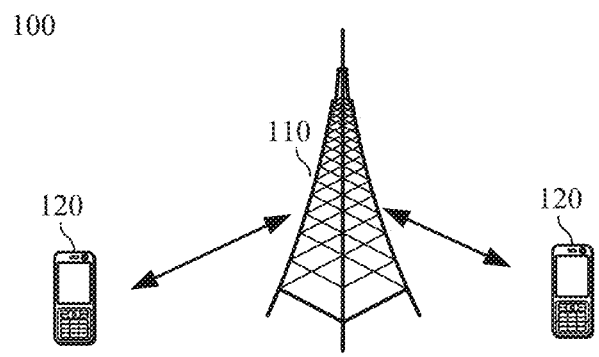
FIG. 1 is a schematic diagram illustrating a wireless communication system to which some embodiments of the present disclosure are applicable.

FIG. 1 illustrates a wireless communication system 100 to which some embodiments of the present disclosure are applicable. The wireless communication system 100 may include communication devices, and the communication devices may include a network device 110 and a terminal device 120. The network device 110 may be in communication with the terminal device 120.

FIG. 1 exemplarily illustrates one network device and two terminal devices. In some embodiments, the wireless communication system 100 may include a plurality of network devices, and a coverage area of each network device may cover other number of terminal devices, which are not limited in embodiments of the present disclosure.

In some embodiments, the wireless communication system 100 may further include other network entities such as network controllers, mobility management entities, and the like, which are not limited in embodiments of the present disclosure.

It shall be understood that technical solutions in the embodiments of the present disclosure may be applied to various communication systems, such as 5th generation (5G) systems or new radio (NR) systems, long term evolution (LTE) systems, frequency division duplex (FDD) systems, LTE time division duplex (TDD) systems, and the like. The technical solutions provided in the present disclosure may also be applied to future communication systems, such as sixth generation mobile communication systems, satellite communication systems, and the like.

The terminal device in the embodiments of the present disclosure may also be referred to as a user equipment (UE), an access terminal, a subscriber unit, a subscriber station, a mobile radio station, a mobile station (MS), a mobile terminal (MT), a remote station, a remote terminal, a mobile device, a user terminal, a terminal, a device for wireless communication, a user agent, or a user device. The terminal device in the embodiments of the present disclosure may be a device providing voice and/or data connectivity to a user, and may be used for communication among people, objects, and machines, such as handheld devices and vehicle-mounted devices that have a wireless connection function. The terminal device in the embodiments of the present disclosure may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, and a wireless terminal in smart homes, and the like. In some embodiments, the UE may function as a base station. For example, the UE may function as a scheduling entity, which provides a sidelink signal between UEs in vehicle-to-everything (V2X) communication or device-to-device (D2D) communication, or the like. For example, a cellular phone and a car communicate with each other using a sidelink signal, or a cellular phone and a smart home device communicate with each other, without relay of a communication signal through a base station.

The network device in the embodiments of the present disclosure may be a device for communicating with the terminal device. The network device may include an access network device which can provide a communication coverage for a specified geographical area and can communicate with the terminal device 120 in the coverage area. The access network device also may be referred to as a radio access network device, a base station, or the like. The access network device in the embodiments of the present disclosure may refer to a radio access network (RAN) node (or device) that accesses a terminal device to a wireless network. The access network device may broadly include the following various terms or be equivalent to the following terms, such as a node B (NodeB), an evolved NodeB (CNB), a next generation NodeB (gNB), a relay station, an access point, a transmitting and receiving point (TRP), a transmitting point (TP), a master eNodeB (MeNB), a secondary cNodeB (SeNB), a multi-standard radio (MSR) node, a home base station, a network controller, an access node, a wireless node, an access point (AP), a transmission node, a transceiver node, a base band unit (BBU), a remote radio unit (RRU), an active antenna unit (AAU), a remote radio head (RRH), a central unit (CU), a distributed unit (DU), a positioning node, and the like. The base station may be a macro base station, a micro base station, a relay node, a donor node, or the like, or a combination thereof. The base station may also refer to a communication module, a modem, or a chip that are provided in the above-mentioned devices or apparatuses. The base station may also be a mobile switching center, as well as a device undertaking the function of a base station in D2D, V2X, machine to machine (M2M) communication, a network-side device in the 6G network, a device undertaking the function of a base station in future communication systems, or the like. The base station may support networks having the same or different access technologies. The embodiments of the present disclosure are not limited to the specific technologies and the specific equipment forms of access network devices.

The base station may be a fixed or mobile base station. For example, a helicopter or unmanned aerial vehicle may be configured to function as a mobile base station and one or more cells may move with the location of the mobile base station. In some other examples, the helicopter or the unmanned aerial vehicle may be configured to serve as a device for communicating with another base station.

The communication equipment involved in wireless communication systems may not only include access network devices and terminal devices, but also include core network elements. A core network element may be realized by a device, namely the core network element may be a core network device. It is understandable that the core network device also may be a network device.

The core network elements in the embodiments of the present disclosure may include the network elements that process and forward signaling and data of users. For example, the core network devices may include core network devices having a core access and mobility management function (AMF), a session management function (SMF), a user plane gateway, a location management function (LMF), etc. The user plane gateway may be a server that has functions of mobility management, routing, forwarding, and the like of user plane data, and is typically on the network side, such as a serving gateway (SGW) or a packet data network gateway (PGW) or a user plane function (UPF), etc. Of course, the core network may also include other network elements, which are not listed here.

In some deployments, the network device in the embodiments of the present disclosure may refer to CU or DU, or the network device includes both the CU and DU. The gNB may also include the AAU.

The network devices and terminal devices may be deployed on land, including indoors or outdoors, handheld or vehicle-mounted, or may be deployed on the water, or may be deployed on airplanes, balloons, and satellites in the air. The scenarios in which the network devices and terminal devices are deployed are not limited in the embodiments of present disclosure.

It should be understood that all or part of the functions of the communication device in the present disclosure can also be implemented by software functions running on hardware, or by virtualization functions instantiated on a platform (such as a cloud platform).

Non-Terrestrial Network (NTN)

In related technologies, the base stations in cellular communication networks may be built on relatively high ground, such as rooftops and mountaintops, to cover a relatively large area. A radius of a coverage area of a base station may vary from hundreds of meters to 100 kilometers. The coverage area of the base station may depend on frequency bands. For example, the coverage area of the base station of low-frequency band (such as 700 MHZ) may be relatively large, and the coverage area of the base station of high-frequency band (24 GHZ) may be relatively small. The population density in urban areas or suburbs is relatively high. If such ground base stations are used, relatively many terminal devices may be covered in the coverage area of each base station. Therefore, in urban areas or suburbs, the coverage of such ground base stations is very efficient. However, even in rural areas with a low population density, operators must establish a base station per certain distance (such as 100 kilometers) to achieve the coverage of base stations. Therefore, if such ground base stations are used in rural areas, there are problems of low efficiency and high cost. In addition, with the continuous development of cellular communication networks and the advancement of technologies such as the Internet of Things, there is an increasing demand for coverage in areas where people rarely go. For example, cellular communication networks need to achieve monitoring of the operation of oil pipelines in desert areas and communication support for ocean-going freighters in the ocean. However, the above ground base stations cannot support such scenarios.

Aiming at the above problems, NTN communication emerged. The NTN communication may be implemented based on satellites or other non-terrestrial communication devices. Therefore, in some embodiments, the NTN communication may also be referred to as satellite communication.

According to a deployment location of a wireless network device, the NTN communication may work in a bent pipe mode or a regeneration mode.

Figure 2A:
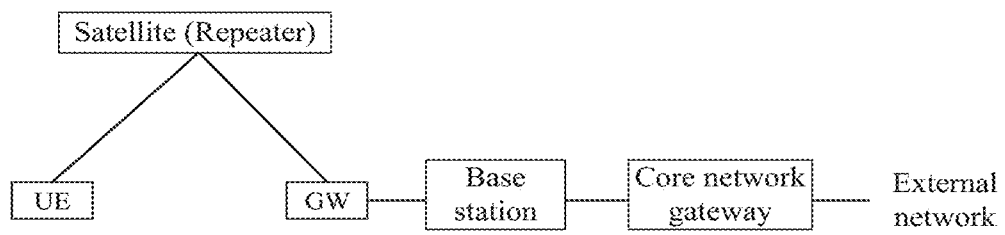
FIG. 2A is a schematic diagram illustrating NTN communication in a bent pipe mode.

FIG. 2A is a schematic diagram illustrating the NTN communication in the bent pipe mode. As shown in FIG. 2A, in the bent pipe mode, the base station is deployed on the ground, and the satellite may function as a repeater. For downlink communication, a downlink signal sent by the base station is transmitted to the satellite through a gateway (GW). The downlink signal is then transmitted to the terminal device on the ground through the satellite, which is a special repeater. For uplink communication, an uplink signal sent by the terminal device is transmitted to the gateway on the ground through a special repeater, i.e. the satellite, and then is transmitted to the base station. With a gateway of the core network, the base station can transmit the uplink signal to an external network.

Figure 2B:
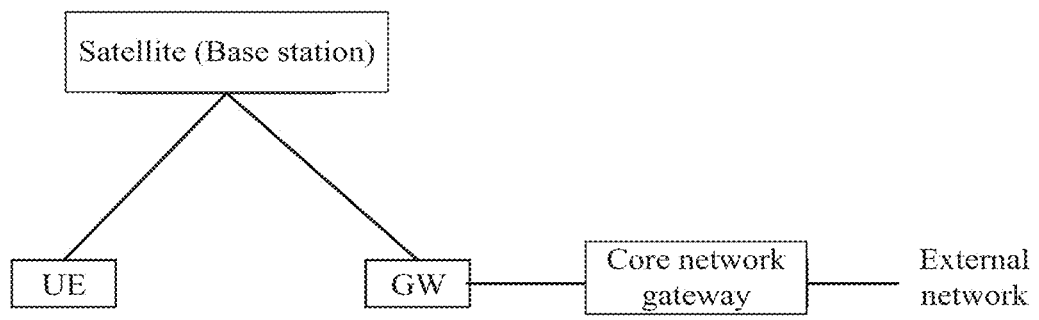
FIG. 2B is a schematic diagram illustrating the NTN communication in a regeneration mode.

FIG. 2B is a schematic diagram illustrating the NTN communication in the regeneration mode. As shown in FIG. 2B, in the regeneration mode, the base station is deployed at the satellite. Data is transmitted between the core network element and the base station through the gateway. The terminal device directly transmits data to the base station at the satellite.

Unlike terrestrial communication systems, the satellite may move continuously along a predetermined orbit. In this case, a coverage area of a cell corresponding to the satellite on the ground may be either mobile or fixed. Depending on whether the cell is mobile or fixed, there are two modes of the cell corresponding to the satellite: mobile cell or fixed cell.

Figure 3A:
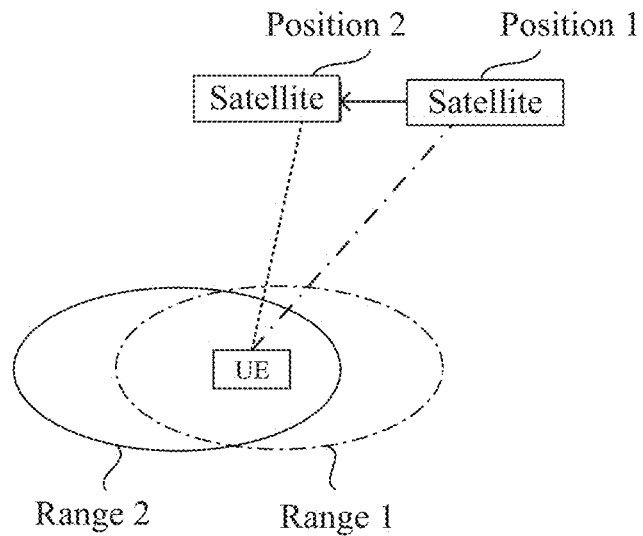
FIG. 3A is a schematic diagram illustrating a mobile cell in accordance with some embodiments.

For a mobile cell, as the satellite moves, the coverage area of the cell also moves on the ground. FIG. 3A is a schematic diagram of a mobile cell. As shown in FIG. 3A, when the satellite is at position 1, the coverage area of the cell is area 1, and when the satellite is at position 2, the coverage area of the cell is area 2. As the satellite moves from position 1 to position 2, the coverage area of the cell corresponding to the satellite changes from area 1 to area 2. As shown in FIG. 3A, the coverage corresponding to area 1 is different from that corresponding to area 2. When the cell is a mobile cell, an implementation of the satellite is relatively simple, an inclination angle of an antenna of the satellite towards the ground may remain unchanged. However, an implementation of the terminal device is relatively complex.

Figure 3B:
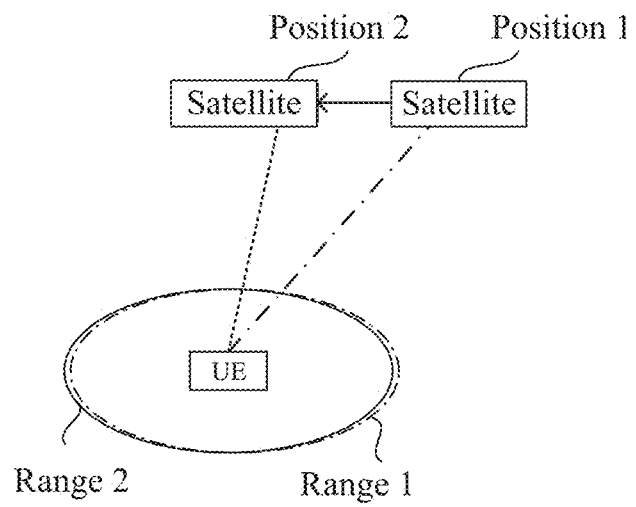
FIG. 3B is a schematic diagram illustrating a fixed cell in accordance with some embodiments.

For a fixed cell, the coverage area of the cell does not move with the satellite. That is, as the satellite moves, the coverage area of the cell barely changes. FIG. 3B is a schematic diagram of a fixed cell. When the satellite is at position 1, the coverage area of the cell is area 1, and when the satellite is at position 2, the coverage area of the cell is area 2. As shown in FIG. 3B, area 1 is almost the same as area 2. When the cell is a fixed cell, the implementation of the satellite is relatively complex, the satellite needs to adjust the inclination angle of the antenna towards the ground according to a physical location of the satellite. However, the implementation of terminal device is relatively simple.

It should be noted that the types of the satellites and the types of the cells as described above are independent relative to each other. In other words, the types may be combined in any way. For example, there may be four combinations: bent pipe mode and mobile cell, bent pipe mode and fixed cell, regeneration mode and mobile cell, and regeneration mode and fixed cell.

Change of the Satellite

Since the satellite may move, even if the terminal device is not moving, the satellite serving the terminal device may change. Taking the combination of bent pipe mode and fixed cell as an example, physical cell ID (PCI) in some communication protocols (such as the protocol of 3GPP) remains unchanged. For the terminal device, as a previous satellite moves out and a new satellite moves in, the base station may remain unchanged, and all configurations used by the cell (including PCI) may remain unchanged. In this case, it can be deemed as that the repeater is changed, which does not involve the change of protocol stacks. Therefore, this process may be called a switch, but it cannot be considered as a switch in a strict sense.

Figure 4:
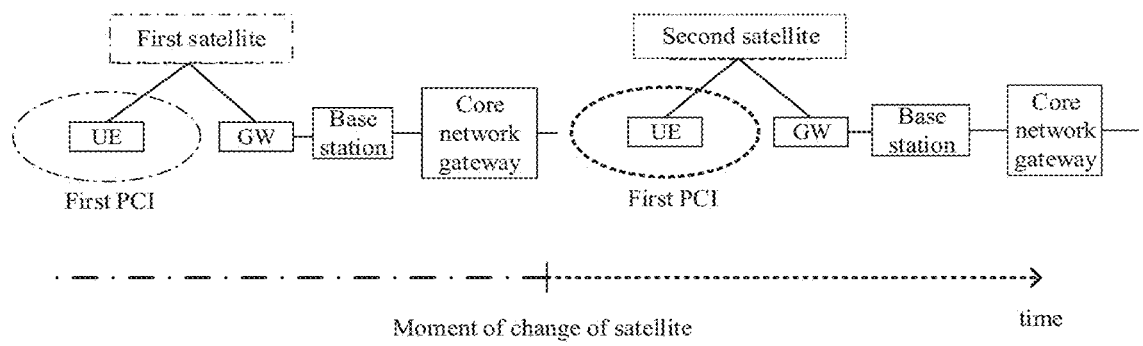
FIG. 4 is a schematic diagram illustrating a process of change of a satellite in which PCI remains unchanged.

FIG. 4 is a schematic diagram illustrating a process of change of a satellite in which PCI remains unchanged. Before the moment of change of a satellite on a time axis, the terminal device (represented by UE in FIG. 4) is in communication with a first satellite, and the PCI of the cell corresponding to the first satellite is a first PCI. After the moment of change of the satellite, the base station replaces the first satellite with a second satellite, and the terminal device begins to transmit data through the second satellite. The PCI of the cell corresponding to the second satellite remains unchanged, i.e. the first PCI. Although the satellite has changed, since all configurations of the base station remain unchanged, all wireless configuration parameters of the terminal device may remain unchanged.

Ephemeris Information

In related technologies, the NTN cell may inform the terminal device of related position information of the satellite through the ephemeris information. Based on the ephemeris information, the terminal device can derive the current location of the satellite. The ephemeris information may be transmitted through a system information broadcast (SIB) 19.

Figure 5:
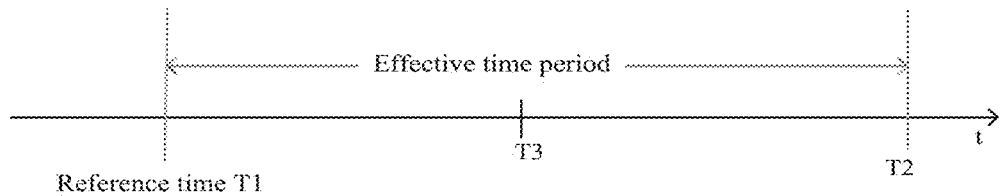
FIG. 5 is a schematic diagram illustrating determination of a position of the satellite at a certain moment through ephemeris information.

In some embodiments, the ephemeris information may include one or more of: a reference moment, a change parameter, and an effective time period. As shown in FIG. 5, the ephemeris information obtained by the terminal device includes the reference moment T1, the effective time period of the ephemeris information (T2-T1), and the change parameter. Based on the information, the terminal device can calculate the location of the satellite at any moment during the time period from T1 to T2. For example, for a moment T3, the terminal device can determine the location of the satellite at the moment T3 based on the location of the satellite at the reference moment T1, a duration of the time period from T1 to T3 (T3-T1), and the change parameter.

It is noted that the network device may provide the ephemeris information to the terminal device before the reference moment or after the reference moment. In addition, before the current ephemeris information becomes invalid, the network device may provide updated ephemeris information to the terminal device.

Figure 6:
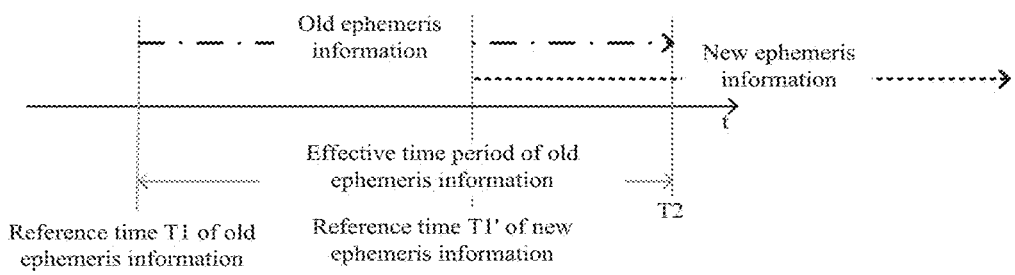
FIG. 6 is a schematic diagram illustrating provision of new ephemeris information by a network device before current ephemeris information becomes invalid.

FIG. 6 is a schematic diagram illustrating provision of new ephemeris information by the network device before current ephemeris information becomes invalid. For case of distinction, the ephemeris information before updating is referred to as old ephemeris information, and the updated ephemeris information is referred to as new ephemeris information. As shown in FIG. 6, the old ephemeris information becomes invalid at moment T2. Before moment T2, the network device may provide the new ephemeris information to the terminal device. The reference moment of the new ephemeris information is T1'. Therefore, during the time period from T1' to T2', the terminal device has two pieces of available ephemeris information. In the case where the terminal device calculates the physical location of a satellite using the ephemeris information, although the physical locations of a same satellite calculated based on the two pieces of ephemeris information may not be the same, the physical locations within a certain accuracy range may be considered valid and equivalent to each other. Therefore, the terminal device may arbitrarily choose one piece of ephemeris information to use.

The related technologies have not yet proposed how the terminal device responds to the change of the satellite. For example, before and after the change of the satellite, qualities of the wireless signals detected by the terminal devices are different, and the related technologies have not proposed how to deal with the difference between the qualities of the wireless signals. Alternatively, for the case where the satellite is changed, the related technologies have not yet proposed how the terminal device uses the ephemeris information. Taking the usage of the ephemeris information after the change of the satellite as an example, the problems that the present disclosure aims to solve are analyzed as follows.

Figure 7:
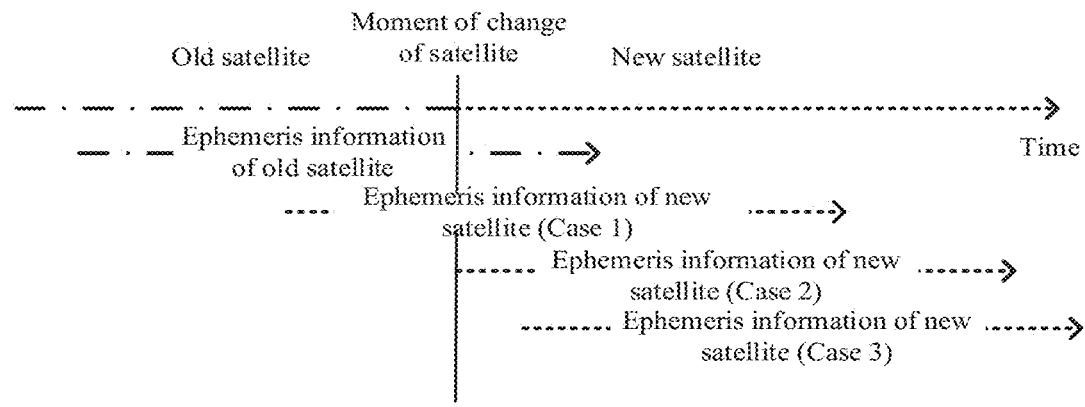
FIG. 7 is a schematic diagram illustrating an effective moment of the ephemeris information corresponding to the changed satellite.

As shown in FIG. 7, an effective moment of the ephemeris information of the changed satellite (hereinafter referred to as a new satellite) may have three cases, each of which has many problems.

Case 1: The effective moment of the ephemeris information of the new satellite is earlier than the moment of the change of the satellite.

In this case, the terminal device may have two pieces of effective ephemeris information for a period of time. For example, in the period of time, the ephemeris of the new satellite has become effective, but the satellite does not change. During this period of time, since the satellite does not change, the terminal device should use the ephemeris information of the satellite before the change (hereinafter referred to as an old satellite). However, according to related technologies, the terminal device may use either the ephemeris information of the old satellite or that of the new satellite. Although for the solution in which the PCI remains unchanged, the wireless configuration of the cell and the wireless parameters of the terminal device remain unchanged during the change of the satellite, there are significant differences between the ephemeris information of the new satellite and that of the old satellite. Therefore, arbitrarily choosing a piece of ephemeris information may result in the possibility that the terminal device uses the ephemeris information of the new satellite before the change of the satellite. That is, the terminal device may use the ephemeris information that does not correspond to the current satellite, resulting in communication anomalies.

Case 2: The effective moment of the new satellite ephemeris is equal to the moment of the change of the satellite.

In this case, the terminal device may immediately use the ephemeris information of the new satellite after the moment of the change of the satellite. However, in this solution, significant restrictions are imposed on the provision of the ephemeris information. For example, the effective moment of the ephemeris information of the new satellite needs to be forcibly made in line with the moment of the change of the satellite by the network side, otherwise the solution cannot be implemented. However, making the effective moment of the ephemeris information of the new satellite in line with the moment of the change of the satellite complicates the implementation of the network device.

Case 3: The effective moment of the new satellite ephemeris is later than the moment of the change of the satellite.

In this case, after the moment of the change of the satellite, the terminal device must wait for the effective moment of the ephemeris information of the new satellite before using the ephemeris information of the new satellite. That is, in Case 3, there is no ephemeris information available for the terminal device between the moment of the change of the satellite and the effective moment of the ephemeris information of the new satellite.

Figure 8:
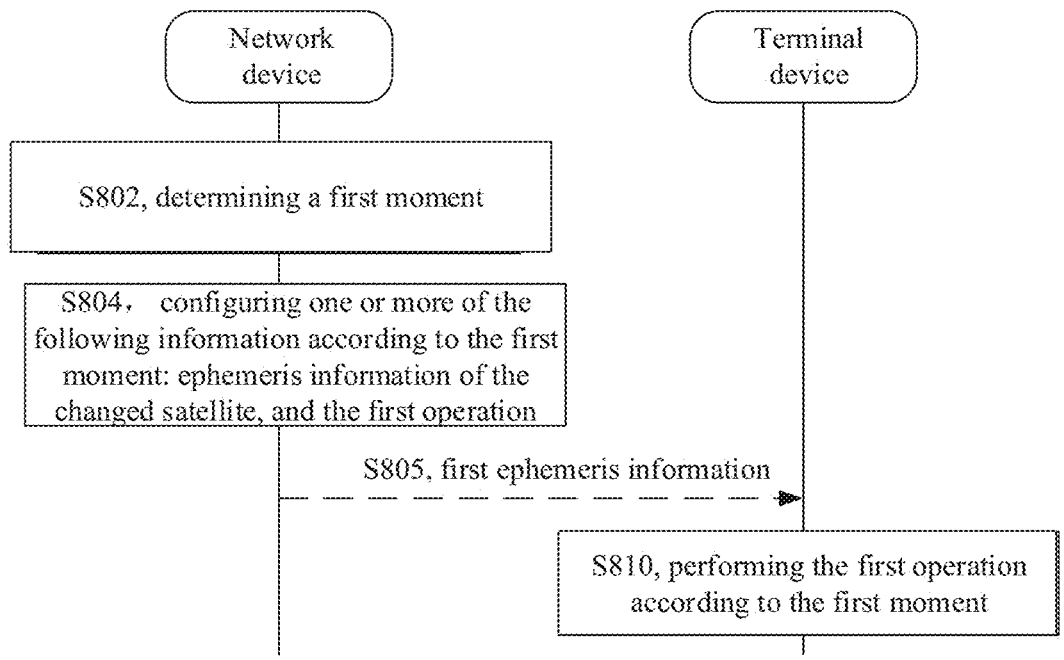
FIG. 8 is schematic flow chart of a method for communication in accordance with some embodiments of the present disclosure.

FIG. 8 is a schematic flow chart of a method for communication in accordance with some embodiments of the present disclosure, used to solve the above problems. The method as shown in FIG. 8 may be performed by a terminal device. The method as shown in FIG. 8 may include operation S810.

At operation S810, the terminal device performs a first operation according to a first moment.

The first moment may be a moment of change of a satellite corresponding to a first cell for the terminal device. Before the first moment, the satellite corresponding to the first cell is not changed (i.e., the old satellite). After the first moment, the satellite corresponding to the first cell is changed (i.e., the new satellite). The PCI of the first cell may remain unchanged before and after the change of the satellite. The first cell may be a serving cell (or called the current cell) for the terminal device.

The first operation may include a second operation and/or a third operation. The second operation may be an operation performed by the terminal device after the terminal device starts to use the ephemeris information of the new satellite. The third operation may be an operation performed by the terminal device in response to the change of the satellite.

When the terminal device performs the second operation according to the first moment, based on the moment of change of the satellite, the terminal device can determine the moment from which the terminal device starts to use the ephemeris information of the new satellite to perform the second operation. That is, the moment when the ephemeris information of the new satellite is used may not be same as the effective moment of the ephemeris information of the new satellite. Therefore, based on the present disclosure, the ephemeris information can be used more conforming to the actual situation, thereby preventing the problems caused by only relating the moment from which the terminal device starts to use the ephemeris information of the new satellite with the effective moment. For example, for the Case 1 as shown in FIG. 7, the terminal device may determine how to use the ephemeris information of the new satellite based on the first moment, thereby preventing usage of the ephemeris information of the new satellite without change of the satellite.

Before the moment of change of the satellite, the network device may provide the terminal device with the ephemeris information of the new satellite. The effective moment of the ephemeris information of the new satellite may be earlier than the moment of change of the satellite. In this case, the terminal device may start to use the ephemeris information of the new satellite as early as possible according to the first moment (for example, start to use the ephemeris information of the new satellite at the first moment), thereby preventing the situation where there is no ephemeris information available for the terminal device after the change of the satellite. For example, for Case 2 or Case 3 as shown in FIG. 7, the ephemeris information of the new satellite may be transmitted before the first moment, and become effective earlier than the first moment (i.e., improved to be Case 1). At the first moment, the terminal device may start to use the ephemeris information of the new satellite. On the one hand, this solution can avoid the requirement of bringing the moments to be in line with each other in Case 2, thereby simplifying the implementation of the communication process. On the other hand, the terminal device can use the ephemeris information of the new satellite as soon as possible after the moment of change of the satellite, thereby reducing the communication interruption duration.

It should be noted that the first operation may be an operation that needs to be performed by any terminal device based on the ephemeris information. For example, the first operation may include one or more of the following operations: calculating a location of the satellite, calculating a moment at which an uplink signal is transmitted to the satellite, transmitting the uplink signal, and calculating a timing advance (TA). The uplink signal may include, for example, a random access preamble. That is, the first operation may also include a random access. Usage of the ephemeris information to perform the first operation by the terminal device may be understood as that the terminal device can perform the first operation using the ephemeris information or based on the ephemeris information.

In response to the change of the satellite, the terminal device may perform a third operation. The third operation may be related with the ephemeris information. It shall be understood that the third operation is beneficial to the change of the satellite and/or the communication after the change of the satellite. For example, performing the third operation can achieve the normal progress of the change of the satellite. Alternatively, through the third operation, communication anomalies after the change of the satellite can be prevented.

The second operation and the third operation are described below, respectively. The moment at which the terminal device starts to perform the second operation based on the ephemeris information of the new satellite may be referred to as a using moment. In some embodiments, the using moment may be equal to the first moment. In other words, the terminal device may start to use the ephemeris information of the new satellite at the moment of the change of the satellite. That is, before the moment of the change of the satellite, the terminal device does not use the ephemeris information of the new satellite; and after the moment of the change of the satellite, the terminal device uses the ephemeris information of the new satellite. In this way, using the ephemeris information of the new satellite before the change of the satellite can be prevented.

In some embodiments, the moment when the terminal device stops using the ephemeris information of the old satellite may be equal to the first moment. In other words, before the moment of the change of the satellite, the terminal device uses the ephemeris information of the old satellite; and after the moment of the change of the satellite, the terminal device does not use the ephemeris information of the old satellite. In this case, even if the effective time of the ephemeris information of the old satellite does not expire, the terminal device may stop using the ephemeris information of the old satellite at the moment of the change of the satellite, thereby preventing using the ephemeris information of the old satellite incorrectly after changing to the new satellite from the old satellite.

In some embodiments, the method as shown in FIG. 8 may be performed by a network device. The method as shown in FIG. 8 may include operations S802 and S804.

At S802, the network device determines the first moment.

At S804, the network device configures one or more of the following information according to the first moment: the ephemeris information of the new satellite, and the first operation. In some embodiments, the method as shown in FIG. 8 may further include operation S805. At S805, the network device transmits first ephemeris information to the terminal device.

The terminal device may determine whether the received first ephemeris information corresponds to the new satellite. In some embodiments, the terminal device may determine whether the first ephemeris information corresponds to the new satellite according to an indication from the network device. The indication of whether the first ephemeris information corresponds to the new satellite may be an explicit indication or an implicit indication, which are further illustrated as follows.

In response to the indication being an explicit indication, the network device may transmit first indication information to the terminal device. The first indication information may be configured to indicate whether the first ephemeris information corresponds to the new satellite.

The method that the first indication information is provided is not limited in the present disclosure. For example, the first indication information may belong to the first ephemeris information. Alternatively, the first indication information and the first ephemeris information may be carried in different messages.

In some embodiments, the first indication information may be carried in a first bit. In other words, the first indication information may be represented by one bit. For example, the first indication information may be represented by one bit in the first ephemeris information. In some embodiments, when a value of the first bit is 0, the first ephemeris information does not correspond to the new satellite, or the first ephemeris information corresponds to the old satellite; and when the value of the first bit is 1, the first ephemeris information corresponds to the new satellite, or the first ephemeris information does not correspond to the old satellite. In some other embodiments, when the value of the first bit is 1, the first ephemeris information does not correspond to the new satellite, or the first ephemeris information corresponds to the old satellite; and when the value of the first bit is 0, the first ephemeris information corresponds to the new satellite, or the first ephemeris information does not correspond to the old satellite.

In some embodiments, the first indication information may be carried in a first parameter. The first parameter may be a Boolean parameter. In other words, the first indication information may be represented by the Boolean parameter. For example, the first parameter may be a parameter in the first ephemeris information. A value of the first parameter may be true or false. In some embodiments, when the value of the first parameter is true, the first ephemeris information does not correspond to the new satellite, or the first ephemeris information corresponds to the old satellite; and when the value of the first parameter is false, the first ephemeris information corresponds to the new satellite, or the first ephemeris information does not correspond to the old satellite. In some other embodiments, when the value of the first parameter is false, the first ephemeris information does not correspond to the new satellite, or the first ephemeris information corresponds to the old satellite; and when the value of the first parameter is true, the first ephemeris information corresponds to the new satellite, or the first ephemeris information does not correspond to the old satellite.

In some embodiments, the first indication information may be optional, that is, in a first message configured to carry the first indication information, the first indication information may or may not present. For example, in response to the terminal device not receiving the indication information at the first moment, the first message may not include the first indication information; and/or, in response to the terminal device receiving the indication information at the first moment, the first message may include the first indication information. Alternatively, in response to the terminal device receiving the indication information at the first moment, the terminal device may receive the first indication information; and/or, in response to the terminal device not receiving the indication information at the first moment, the terminal device may not receive the first indication information.

It should be noted that the message carrying the indication information at the first moment may be either the first message or a second message different from the first message. The first message or the second message may include, for example, broadcast messages and/or radio resource control (RRC) messages. The broadcast messages may be, for example, SIB19 messages. The broadcast messages may be used to indicate the above information to the terminal device in an idle state or a connected state. Dedicated RRC messages may be used to indicate the above information to the terminal device in a connected state.

The method for explicitly indicating whether the first ephemeris information corresponds to the new satellite is illustrated above. The implicit indication method is illustrated below.

In some embodiments, the effective moment of the first ephemeris information may be a second moment. Whether the first ephemeris information corresponds to the new satellite or not may be determined based on the second moment.

Figure 9:
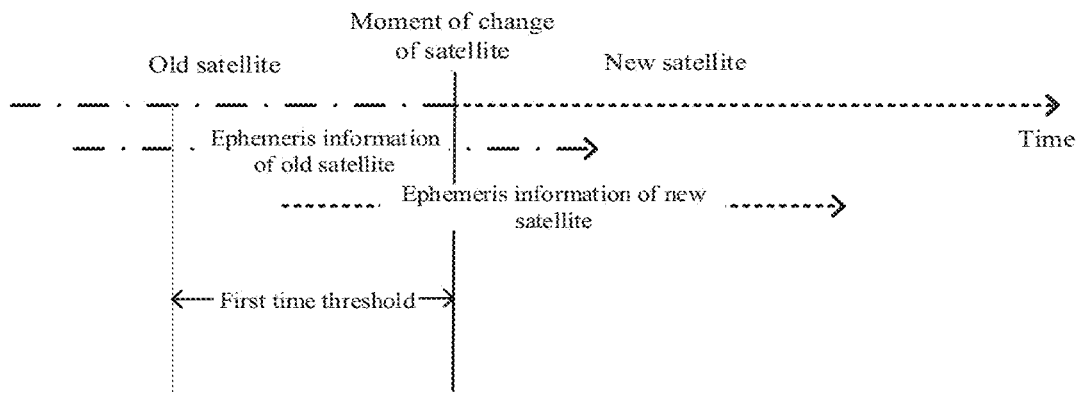
FIG. 9 is a schematic diagram of an implicit indication of whether first ephemeris information corresponds to a new satellite.

FIG. 9 is a schematic diagram of the implicit indication of whether the first ephemeris information corresponds to the new satellite. As shown in FIG. 9, when a difference between the second moment and the first moment is less than or equal to a first time threshold, the first ephemeris information may correspond to the new satellite; and/or, when the difference between the second moment and the first moment is greater than the first time threshold, the first ephemeris information may correspond to the old satellite. In this case, the second moment may be earlier than the first moment.

The way of determining the first time threshold is not specifically limited in the present disclosure. For example, the first time threshold may be determined or indicated by one or more of the following: a provision of protocols, a RRC message, a medium access control control element (MAC CE), and downlink control information (DCI). For example, the first time threshold may be indicated through a broadcast message. In response to the first time threshold being acquired through the RRC message, the terminal device may acquire the first time threshold through the RRC messages of the current cell (such as the first cell) or through the RRC messages of other cells. The broadcast message may include a SIB message. The RRC message may be a dedicated RRC message.

In some embodiments, the network device may indicate that a satellite corresponding to a first neighboring cell is going to become the satellite corresponding to the first cell. Since an orbit of the satellite is predictable, it is possible that the satellite corresponding to the neighboring cell becomes the satellite corresponding to the first cell. Based on the second indication information, the terminal device may directly determine the ephemeris information of the new satellite through the ephemeris information of the neighboring cell. Therefore, the network device does not need to additionally inform the terminal device of the ephemeris information of the new satellite, thereby reducing the consumption of communication resources.

The network device may explicitly or implicitly indicate that the satellite corresponding to the first neighboring cell is going to become the new satellite corresponding to the first cell.

Taking the explicit indication as an example, the network device may transmit second indication information to the terminal device. The second indication information may be used to indicate that the satellite corresponding to the first neighboring cell of the terminal device is going to become the satellite corresponding to the first cell. In other words, the second indication information may indicate that at the first moment, the satellite corresponding to the first cell is going to change to the satellite corresponding to the first neighboring cell.

The second indication information may be indicated by a Boolean variable, a second bit, and a newly-added parameter, etc.

For example, the second indication information may be indicated by a "true" or "false" Boolean variable. In some embodiments, when the second indication information is true, the satellite corresponding to the first neighboring cell is going to become the satellite corresponding to the first cell; and when the second indication information is false, the satellite corresponding to the first neighboring cell is not going to become the satellite corresponding to the first cell. In some other embodiments, when the second indication information is false, the satellite corresponding to the first neighboring cell is going to become the satellite corresponding to the first cell; and when the second indication information is true, the satellite corresponding to the first neighboring cell is not going to become the satellite corresponding to the first cell.

As another example, the second indication information may be indicated by the second bit, that is, one bit. The second bit may be valued by 0 or 1. In some embodiments, when the second indication information is 0, the satellite corresponding to the first neighboring cell is going to become the satellite corresponding to the first cell; and when the second indication information is 1, the satellite corresponding to the first neighboring cell is not going to become the satellite corresponding to the first cell. In some other embodiments, when the second indication information is 1, the satellite corresponding to the first neighboring cell is going to become the satellite corresponding to the first cell; and when the second indication information is 0, the satellite corresponding to the first neighboring cell will not become the satellite corresponding to the first cell.

In some embodiments, the second indication information may be carried in the ephemeris information of the satellite corresponding to the first neighboring cell. In response to the second indication information existing in the ephemeris information of the satellite corresponding to the first neighboring cell, the satellite corresponding to the first neighboring cell is going to become the new satellite corresponding to the first cell. In response to the second indication information not existing in the ephemeris information of the satellite corresponding to the first neighboring cell, the satellite corresponding to the first neighboring cell is not going to become the new satellite corresponding to the first cell.

Figure 10:
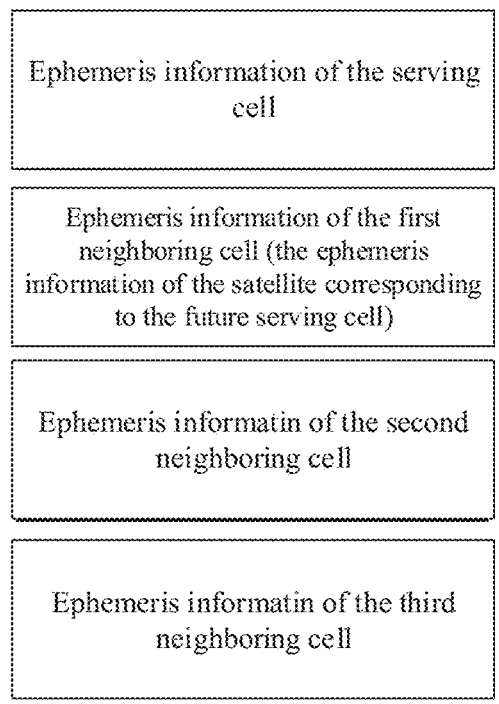
FIG. 10 is a schematic diagram illustrating an ephemeris information list in accordance with some embodiments of the present disclosure.

The ephemeris information of the current cell and the neighboring cell may be indicated through an ephemeris information list. That is, the ephemeris information list may include one or more pieces of ephemeris information. The one or more pieces of ephemeris information may correspond to the current cell and/or the neighboring cell. FIG. 10 is an example diagram of the ephemeris information list. The ephemeris information list as shown in FIG. 10 includes: the ephemeris information of the current cell and ephemeris information of three neighboring cells. As shown in FIG. 10, the explicit second indication information may be added to the ephemeris information of the first neighboring cell, such that the network device may inform the terminal device that "from the moment of the change of the satellite, the ephemeris information of the first neighboring cell becomes the ephemeris information of the current cell".

Taking the implicit indication as an example, the ephemeris information of the first neighboring cell may belong to the ephemeris information list. The ephemeris information list may include: ephemeris information of a serving cell of the terminal device, and/or the ephemeris information of the one or more neighboring cells of the terminal device. The ephemeris information of the first neighboring cell may occupy a first position in the ephemeris information list. The first position may be used to indicate whether the satellite corresponding to the first neighboring cell is going to become the satellite corresponding to the first cell. In this way, the network device is allowed not to transmit additional indication information, thereby preventing the occupation of resources due to additional transmission of indication information.

In some embodiments, when the first position satisfies a first condition, the satellite corresponding to the first neighboring cell is going to become the satellite corresponding to the first cell (namely, the new satellite). For example, the first condition may include: the first position is a position of the first neighboring cell. That is, when the ephemeris information corresponding to the first neighboring cell is the ephemeris information of a neighboring cell occupying the first position in the ephemeris information list, the ephemeris information corresponding to the first neighboring cell is going to become the ephemeris information of the new satellite. Alternatively, the first condition may include: the first position is a N-th position in the ephemeris information list of one or more neighboring cells. Namely, the first position is a position of a N-th neighboring cell. That is, when the ephemeris information corresponding to the first neighboring cell is the ephemeris information of a N-th neighboring cell of the neighboring cells in the ephemeris information list, the ephemeris information corresponding to the first neighboring cell is going to become the ephemeris information of the new satellite, where N may be a positive integer. N may be provided by protocols or configured by the network device. Taking the ephemeris information as shown in FIG. 10 as an example, when N=1, the satellite corresponding to the first neighboring cell is going to become the satellite corresponding to the first cell. When N=2, the satellite corresponding to the second neighboring cell is going to become the satellite corresponding to the first cell. When N=3, the satellite corresponding to the third neighboring cell is going to become the satellite corresponding to the first cell.

Transmission delay of the new satellite and of the old satellite may be different. Therefore, for the terminal devices, a jitter of a sub-frame boundary (for example, downlink sub-frame boundary) may occur. That is, for the terminal device, boundaries of the frames and/or sub-frames having the same numberings and corresponding to the new satellite and the old satellite may not coincide with each other. In the present disclosure, a fourth moment associated with the ephemeris information of the new satellite may be determined based on the following sub-frame boundary: the sub-frame boundary before the change of the satellite; or, the sub-frame boundary after the change of the satellite. In this way, the present disclosure clarifies the sub-frame boundary, thereby addressing the problem of ambiguity of the fourth moment caused by the change of the satellite.

The network device may indicate, through boundary indication information, that the fourth moment is determined based on the sub-frame boundary of the new satellite or the sub-frame boundary of the old satellite. The boundary indication information may be carried in one or more of the following messages: a RRC message, DCI, and a MAC CE. The boundary indication information may be configured in one or more of the following ways: a Boolean, a binary symbol (one bit) or an enumeration variable.

The fourth moment may include one or more of the following moments: the moment when the ephemeris information of the new satellite becomes invalid, and the moment when the ephemeris information of the new satellite becomes effective.

Figure 11:
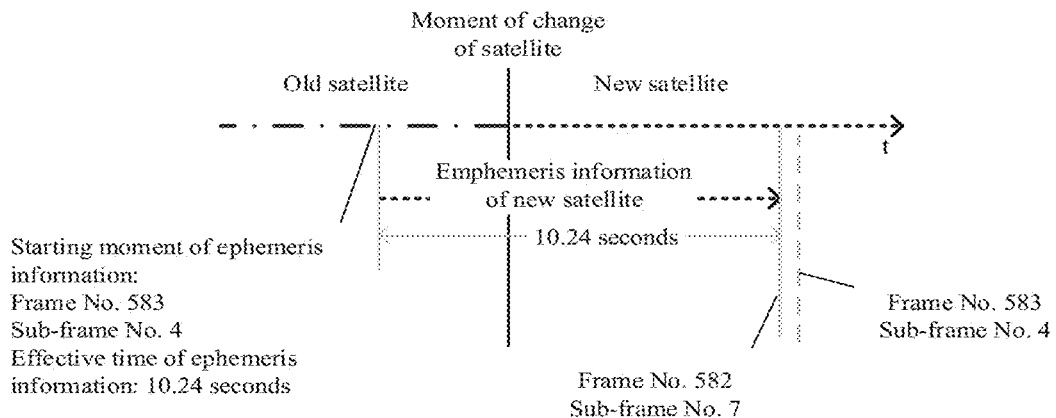
FIG. 11 is an example diagram illustrating a jitter of a sub-frame boundary in accordance with some embodiments of the present disclosure.

To facilitate understanding, the determination of the fourth moment is explained in FIG. 11 below. In the example as shown in FIG. 11, the terminal device receives the ephemeris information of the new satellite. The effective moment of the ephemeris information of the new satellite is "frame No. 583, sub-frame No. 4", and the effective duration of the ephemeris information is 10.24 seconds. When the terminal device uses the ephemeris information, the terminal device may calculate a timing advance (TA) of uplink transmission using the moment corresponding to the frame numbered 583 and the sub-frame numbered 4 of the old satellite as the effective moment. On the other hand, with the effective duration of 10.24 seconds of the ephemeris, after a cycle of system frame numbers (SFNs), and when the numbering of frame is 583 and the numbering of the sub-frame is 4, the ephemeris information becomes invalid. However, due to the different physical locations of the two satellites, from the perspective of the terminal device, the jitter of the sub-frame boundary occurs. Regarding the sub-frame boundary in the case where the satellite corresponding to the first cell is the old satellite, an invalidity moment of the ephemeris information obtained by adding 10.24 seconds to an effective moment of the ephemeris information is represented by the gray solid line as shown in FIG. 11. However, regarding the sub-frame boundary in the case where the satellite corresponding to the first cell is the new satellite, when the effective moment of the ephemeris information is determined by "frame No. 583, sub-frame No. 4", then the invalidity moment of the ephemeris information should also be determined by "frame No. 583, sub-frame No. 4", namely the moment as presented by the gray dotted line in FIG. 11. When the invalidity moments obtained by the two calculation methods are different, the protocol may provide that the terminal device uses the gray solid line as the invalidity moment of the ephemeris information, or provide that the terminal device uses the gray dotted line as the invalidity moment of the ephemeris information, or allow the network device to select which moment should be used as the invalidity moment of the ephemeris information.

The third operation is described below.

The third operation may be associated with one or more of the following: a power headroom report (PHR), a timing advance (TA), a power adjustment value, a random access, a K offset, and a radio link monitoring (RLM).

It should be noted that a performing moment of the third operation may be associated with the first moment. For example, the performing moment of the third operation may be the first moment or later than the first moment. That is, the terminal device may perform the third operation when the satellite changes or after the change of the satellite. Alternatively, the performing moment of the third operation may be earlier than the first moment. That is, the terminal device may perform the third operation before the change of the satellite.

In some embodiments, the third operation includes one or more of the following: before the first moment, when the terminal device triggers a first PHR, canceling the triggering of the first PHR; triggering a second PHR; triggering a TA reporting; resetting the power adjustment value to zero; part of or all the operations performed by the terminal device after a timing advance timer (TAT) times out; clearing a hybrid automatic repeat request (HARQ) buffer; acquiring an uplink synchronization through the random access; when the terminal device starts the random access before the first moment and continues the random access after the first moment, resetting a first counter associated with the random access, and incrementing the first counter by one counting unit or remaining the first counter unchanged; when the terminal device starts the random access before the first moment and continues the random access after the first moment, performing a downlink synchronization in response to downlink asynchronization; and/or re-selecting a random access resource according to the signal quality of the changed satellite; using the K offset configured by the changed satellite or the K offset with a value of 0; resetting a second counter associated with the RLM; and stopping a first timer associated with the RLM. Each of the above operations is described below.

In some embodiments, before the first moment, when the terminal device triggers the first PHR, the third operation may include canceling the triggering of the first PHR. That is, when the terminal device triggers the PHR before the moment of the change of the satellite, the terminal device may cancel the triggering of the PHR. It should be noted that the triggering of the first PHR may be canceled at or after the first moment.

The PHR is triggered because "compared with a pathloss occurred in last transmission of the PHR, a change in a value of the pathloss exceeds a threshold". After the change of the satellite, the value of the pathloss is not associated with the previous pathloss anymore. In this case, the previously triggered pathloss has no reference value for the network device any more. Therefore, canceling the triggering of the first PHR can reduce unnecessary communication processes and simplify communication operations.

In some embodiments, the third operation may include triggering a second PHR in response to a change of the satellite. For example, after the moment of the change of the satellite or after the change of the satellite, the terminal device may re-trigger the PHR.

After the change of the satellite, the measurement of the pathloss by the terminal device may be deemed as a newly started measurement. Therefore, when the second PHR is triggered after the change of the satellite and is used as the reference of the measurement of the pathloss, a reference can be provided to a scheduling algorithm of the network device.

In some embodiments, the third operation may include triggering the TA reporting. For example, after the moment of the change of the satellite or the change of the satellite, the terminal device may trigger the TA reporting.

The change of the satellite causes an original TA value of the terminal device to become invalid. The original TA value no longer has a reference value for a scheduling of the network device. Therefore, the TA value reported by the terminal device in the present disclosure has a reference value for the scheduling algorithm of the network device.

It should be noted that the TA reporting triggered in the third operation may be performed through any uplink resource, which is not limited in the present disclosure. For example, the resources for the TA reporting may include one or more of the following: uplink resources obtained by the terminal device through the random access, and uplink resources obtained by the terminal device through other ways. The uplink resources obtained through other ways may include, for example, resources allocated to the terminal device by the network device using dynamic scheduling or semi-static scheduling.

In some embodiments, the third operation may include resetting the power adjustment value to zero. For example, at or after the moment of the change of the satellite, the terminal device may reset the power adjustment value to zero. The power adjustment value may be recorded by the terminal device and is associated with a transmission power of the terminal device.

The power adjustment value may be an accumulated value. For example, the network device may adjust the power of the terminal device using an accumulated mode. That is, the terminal device may determine the uplink transmission power according to the measured pathloss and the power adjustment values recorded by the terminal device in an accumulated way. In some embodiments, the power adjustment values may be for example associated with a transmit power control (TPC). For example, the network device may continuously transmit the TPC to the terminal device to inform the terminal device of adjusting the recorded power adjustment values. In this case, the power adjustment values may include an accumulated value of the TPC.

In response to the change of the satellite, the power adjustment values recorded by the terminal device become invalid. The technical solution proposed in the present disclosure of resetting the power adjustment value to zero can achieve accurate recording of the power adjustment value after the change of the satellite, thereby allowing the terminal device to determine the uplink transmission power suitable for the new satellite.

In some embodiments, the third operation may include part of or all the operations need to be performed by the terminal device after the TAT times out. That is, the change of the satellite may be equivalent to the timeout of the TAT to some extent. The third operation may include, for example, clearing the HARQ buffer and/or acquiring the uplink synchronization through the random access.

When the terminal device starts the random access before the first moment and needs to continue the random access after the first moment, the third operation may be associated with the first counter. The first counter may be associated with the random access. For example, the first counter may include a counter for counting the number of times of random access, and/or a counter for counting the number of power ramping of the random access. That is, the first counter may be used to count: the number of times of random access, and/or the number of power ramping of the random access.

As for the first counter, the third operation may include: resetting the first counter, and incrementing the first counter by one counting unit or remaining the first counter unchanged. That is, for a first random access after the change of the satellite, the first counter may start counting from 0, and be incremented by one counting unit or remain unchanged. The counting unit may be one or more minimum counting units that can be counted by the counter.

It should be noted that when the first counter includes a plurality of counters, the third operations corresponding to the plurality of counters may be different or the same. As an example, when the first counter includes a counter used to count the number of times of random access and a counter used to count the number of power ramping of the random access, for the first random access after the change of the satellite, the first counter may count using any of the modes 1 to 3 as shown in Table 1.

TABLE 1

| | The counter for counting the number of times of random access | The counter for counting the number of power ramping of the random access |
| --- | --- | --- |
| Mode 1 | Starting from 0 | Starting from 0 |
| Mode 2 | Incremented by 1 | Incremented by 1 |
| Mode 3 | Incremented by 1 | Remaining unchanged |

As shown in Table 1, when Mode 1 is used, the terminal device resets both counters and starts counting again from 0. When Mode 2 is used, the terminal device may increment the counter for counting the number of times of random access by 1, and also increment the counter for counting the number of power ramping of the random access by 1. When Mode 3 is used, the terminal device may increment the counter for counting the number of times of random access by 1, and remain the counter for counting the number of power ramping of the random access unchanged.

In some embodiments, when the terminal device starts the random access before the first moment and continues the random access after the first moment, the third operation may include: performing the downlink synchronization in response to downlink asynchronization; and/or re-selecting a random access resource based on the signal quality of the changed satellite.

When the terminal device is performing the random access before the moment of the change of the satellite, and continues the random access after the change of the satellite, the terminal device needs to ensure the downlink synchronization before the first random access after the change of the satellite. In a case of downlink asynchronization at this time, the present disclosure proposes that the terminal device needs to perform the downlink synchronization before performing the random access.

When the terminal device is performing the random access before the moment of the change of the satellite, and the random access resource selected by the terminal device is associated with the signal quality, at the moment of the change of the satellite or after the change of the satellite, the terminal device may re-select the random access resource based on the signal quality after the change of the satellite to continue the random access. The signal quality may include, for example, a reference signal received power (RSRP). As an example, in a coverage enhancement scenario, different RSRP values correspond to different random access resource pools, or different RSRPs may correspond to supplementary uplink (SUL) carriers or normal carriers.

It should be noted that continuing the random access described in the present disclosure may refer to that the MAC layer of the terminal device continues the random access, which may not involve RRC, that is, continuing the random access does not refer to the random access re-triggered by RRC.

In some embodiments, the third operation may include an operation indicating one or more of the following: after or at the first moment, the terminal device can use the K offset configured for the changed satellite, or the terminal device uses the K offset with a value of 0.

In some embodiments, at, before or after the moment of the change of the satellite, an internal MAC layer of the terminal device indicates to a physical (PHY) layer that the K offset is 0. After the moment of the change of the satellite or after the change of the satellite, the terminal device may use the K offset with a value of 0. In some other embodiments, before the moment of the change of the satellite, the terminal device receives the K offset with a new value indicated by the network device. Moreover, the network device may simultaneously indicate that "the new value of the K offset shall only be used at the moment of the change of the satellite or after the change of the satellite". Furthermore, the MAC layer of the terminal device indicates the new K offset to the PHY layer. After the moment of the change of the satellite or the change of the satellite, the terminal device may use the K offset configured for the new satellite by the network device.

In some embodiments, when the terminal device receives the K offset indicated by the network device, the terminal device may start to use the K offset after the first moment. When the terminal device does not receive the K offset indicated by the network device, the terminal device may use the K offset with a value of 0.

In some embodiments, both the second counter and the first timer may be associated with the RLM. The third operation may include: resetting the second counter; and/or stopping the first timer.

The second counter may include, for example, a counter for counting the number of times of a result of a single measurement of the wireless signal being greater than or equal to a first threshold, and/or a counter for counting the number of times of a result of a single measurement of the wireless signal being less than a second threshold. The counting value of the counter for counting the number of times of a result of a single measurement of the wireless signal being greater than or equal to the first threshold may be compared with N310, and the counting value of the counter for counting the number of times of a result of a single measurement of the wireless signal being less than the second threshold may be compared with N311.

The first timer may be a timer used to determine a radio link failure (RLF). For example, the first timer may include a T310 timer.

To facilitate understanding of the second counter and the first timer, an example is illustrated below with reference to FIG. 12.

Figure 12:
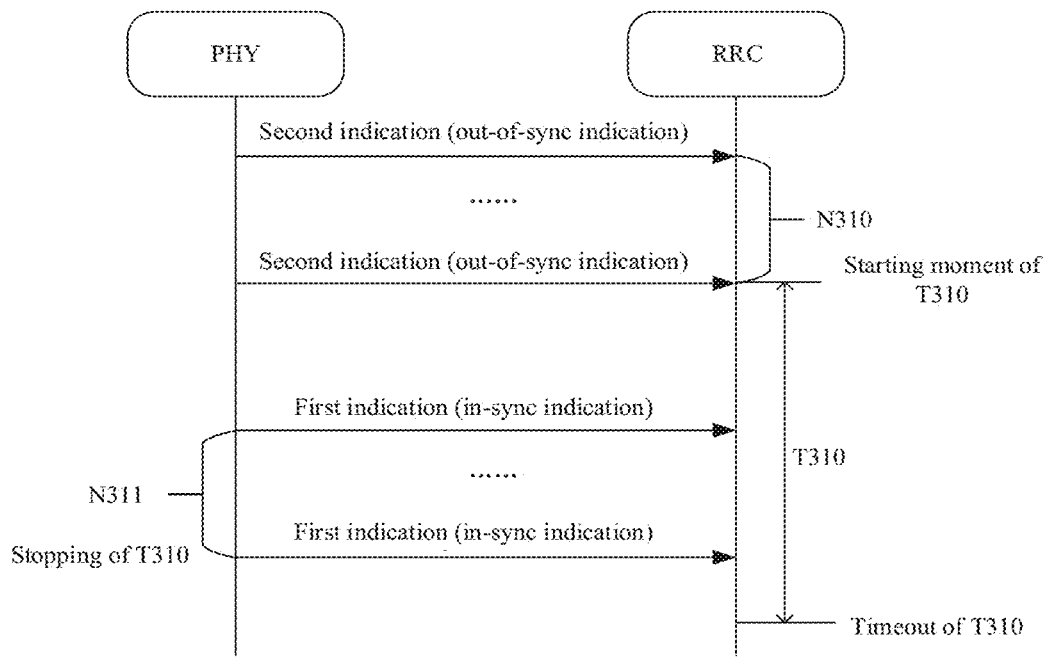
FIG. 12 is an example diagram illustrating a RLM process based on a second counter and a first timer in accordance with some embodiments.

As shown in FIG. 12, during a RLM process, the RRC of the terminal device continuously receives a wireless signal quality indication from the PHY layer, and determines whether a RLF occurs in the current serving cell based on the wireless signal quality indication. The wireless signal quality indication may include a first indication and a second indication. The first indication may include, for example, an in-sync indication, and the second indication may include, for example, an out-of-sync indication. The first indication may indicate that the result of a single measurement of the wireless signal is greater than or equal to the first threshold. The second indication may indicate that the result of a single measurement of the wireless signal is less than the second threshold. When the number of times of continuously receiving the second indication by the RRC exceeds N310, the T310 timer may be started. During running of T310, when the number of times of continuously receiving the first indication by the RRC exceeds N311, it is considered that the radio link signal quality is normal, and T310 is stopped. When the number of times of continuously receiving the first indication by the RRC does not exceed N311, T310 continues to work. When T310 times out, it may be considered that the wireless link fails.

In the flow as shown in FIG. 12, the second counter may be used to: count the number of second indications that are continuously received to determine whether the number is greater than N310; and/or, the number of first indications that are continuously received to determine whether the number is greater than N311. The first timer may include T310.

Since the wireless signal quality before the change of the satellite has no correlation with the wireless signal quality after the change of the satellite, resetting the second counter and/or stopping the first timer can prevent the impact on the RLM process caused by the old satellite, thereby allowing the RLM process to be more accurate.

It should be noted that whether the terminal device performs the third operation or not may be determined by:

the provision of protocols and/or configuration of the network device. Continuing to refer to FIG. 8, operation S804 may include: configuring, by the network device, the third operation based on the first moment.

In some embodiments, whether to perform the third operation or not may be configured by the network device. The network device may indicate whether to perform the third operation through first configuration information. The present disclosure does not limit a transmitting moment or a receiving moment of the first configuration information. For example, the transmitting moment or the receiving moment may be earlier than, later than, or equal to the first moment. The above transmitting moment and/or the receiving moment may be provided by protocols. In addition, the present disclosure does not limit the messages carrying the first configuration information. For example, the first configuration information may be carried in one or more of the following messages: a RRC message, a MAC CE, DCI, and the like.

In some embodiments, the first configuration information is used to configure whether the terminal device performs one or more of the following operations: before the first moment, when the terminal device triggers a first PHR, canceling the triggering of the first PHR; triggering a second PHR; triggering a TA reporting; resetting the power adjustment value to zero; part of or all the operations performed by the terminal device after a TAT times out; clearing a HARQ buffer; acquiring an uplink synchronization through the random access; when the terminal device starts the random access before the first moment and continues the random access after the first moment, resetting the first counter associated with the random access, and incrementing the first counter by one counting unit or remaining the first counter unchanged; when the terminal device starts the random access before the first moment and continues the random access after the first moment, performing a downlink synchronization in response to downlink asynchronization; and/or re-selecting a random access resource according to the signal quality of the changed satellite; using the K offset configured by the changed satellite or the K offset with a value of 0; resetting the second counter associated with the RLM; and stopping the first timer associated with the RLM. Each of the above operations is described below.

In some embodiments, the network device may indicate the first moment to the terminal device. For example, the network device may transmit third indication information to the terminal device. The third indication information may be used to indicate the first moment.

In some embodiments, the first moment may be represented by an identification of a time unit and/or absolute time.

The time unit may include one or more of the following: a radio frame, a sub-frame, a time slot, and an orthogonal frequency division multiplexing (OFDM) symbol. The identification of the time unit may be, for example, a numbering, ID, or the like of the time unit. That is, the first moment may be represented by one or more of: a numbering of the radio frame, a numbering of the sub-frame, a numbering of the time slot, and a numbering of the OFDM symbol. In some implementations, the first moment may be a moment meeting the identification of the time unit indicated by the third indication information in the nearest future. For example, the third indication information may indicate the first moment in the form of "numbering of a frame+numbering of a sub-frame". After receiving the third indication information, the terminal device may regard a moment that matches the "numbering of a frame+numbering of a sub-frame" in the nearest future as the first moment.

The absolute time may be expressed by one or more of: years, months, days, hours, minutes, seconds, milliseconds, and microseconds. For example, the first moment may be represented by 16:58:34:304 on Jun. 2, 2023.

It should be noted that the present disclosure does not limit the messages carrying the third indication information. For example, the third indication information may be carried in one or more of the following messages: a RRC message, a MAC CE, and DCI. Alternatively, the third indication information may be carried in a broadcast message.

The method embodiments of the present disclosure are described in detail above. The apparatus embodiments of the present disclosure are described in detail below. It should be understood that the description of the method embodiments corresponds to the description of the apparatus embodiments, and therefore, for parts that are not described in detail, reference may be made to the foregoing method embodiments.

Figure 13:
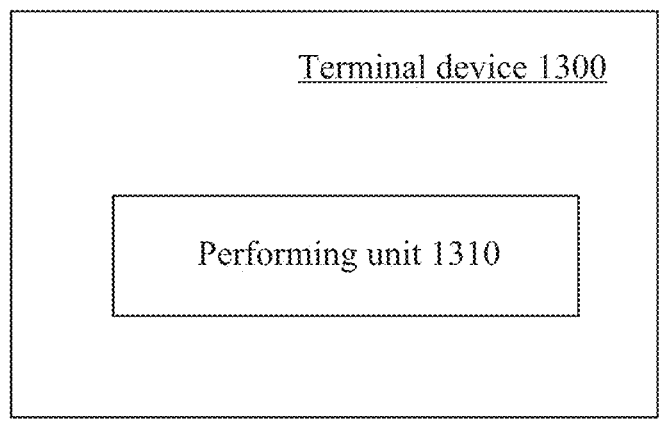
FIG. 13 is a schematic diagram illustrating a structure of a terminal device in accordance with some embodiments of the present disclosure.

FIG. 13 is a schematic diagram illustrating a structure of a terminal device 1300 in accordance with some embodiments of the present disclosure. The terminal device 1300 includes a performing unit 1310.

The performing unit 1310 is configured to perform a first operation according to a first moment. The first moment refers to a moment of a change of a satellite corresponding to a first cell for the terminal device, and the first operation includes one or more of the following operations: a second operation performed by the terminal device after the terminal device starts to use ephemeris information of a changed satellite; and a third operation performed by the terminal device in response to the change of the satellite corresponding to the first cell.

In some embodiments, the terminal device starts to use a moment in the ephemeris information of the changed satellite to perform the second operation at the first moment.

In some embodiments, the terminal device stops using ephemeris information of the satellite before the change of the satellite to perform the second operation at the first moment.

In some embodiments, the terminal device is further configured to receive first ephemeris information, and determine whether the first ephemeris information corresponds to the changed satellite.

In some embodiments, the terminal device is further configured to receive first indication information. The first indication information is configured to indicate whether the first ephemeris information corresponds to the changed satellite.

In some embodiments, the first indication information is configured to be carried by a first message, and the first message does not include the first indication information in response to the terminal device not receiving the indication information at the first moment.

In some embodiments, an effective moment of the first ephemeris information is a second moment, and whether the first ephemeris information corresponds to the changed satellite or not is determined based on the second moment.

In some embodiments, when a difference between the second moment and the first moment is less than or equal to a first time threshold, the first ephemeris information corresponds to the changed satellite; or, when the second moment is later than or equal to the first moment, the first ephemeris information corresponds to the changed satellite.

In some embodiments, the terminal device is further configured to receive second indication information. The second indication information is configured to indicate that a satellite corresponding to a first neighboring cell for the terminal device is going to become the satellite corresponding to the first cell.

In some embodiments, ephemeris information of a first neighboring cell occupies a first position in an ephemeris information list, and whether the satellite corresponding to the first neighboring cell for the terminal device is going to become the satellite corresponding to the first cell or not is determined based on the first position.

In some embodiments, in response to the first position being a N-th position in the ephemeris information list for one or more neighboring cells, the satellite corresponding to the first neighboring cell is going to become the satellite corresponding to the first cell, where N is a positive integer.

In some embodiments, a fourth moment corresponding to the ephemeris information of the changed satellite is determined based on following sub-frame boundaries: a sub-frame boundary before the change of the satellite; or, a sub-frame boundary after the change of the satellite.

In some embodiments, the fourth moment includes at least one of an invalidity moment of the ephemeris information of the changed satellite, or the effective moment of the ephemeris information of the changed satellite.

In some embodiments, the third operation is associated with one or more of the following: a power headroom reporting (PHR), a timing advance (TA), a power adjustment value, a random access, a K offset, and a radio link monitoring (RLM).

In some embodiments, the third operation includes one or more of the following: before the first moment, when the terminal device triggers the first PHR, canceling triggering of the first PHR; triggering a second PHR; triggering a TA reporting; resetting the power adjustment value to zero; part of or all the operations performed by the terminal device after a timing advance timer (TAT) times out; clearing a HARQ buffer; acquiring an uplink synchronization through the random access; when the terminal device starts the random access before the first moment and continues the random access after the first moment, resetting a first counter associated with the random access, and incrementing the first counter by one counting unit or remaining the first counter unchanged; when the terminal device starts the random access before the first moment and continues the random access after the first moment, performing a downlink synchronization in response to downlink asynchronization; and/or re-selecting a random access resource according to the signal quality of the changed satellite; using the K offset configured by the changed satellite or the K offset with a value of 0; resetting a second counter associated with the RLM; and topping a first timer associated with the RLM.

In some embodiments, the terminal device is further configured to receive first configuration information. The first configuration information is used to control whether the terminal device performs the third operation.

In some embodiments, the first configuration information is used to control whether the terminal device performs one or more of the following operations: before the first moment, when the terminal device triggers the first PHR, canceling the triggering of the first PHR; triggering the second PHR; triggering the TA reporting; resetting the power adjustment value to zero; part of or all operations performed by the terminal device after the TAT times out; clearing the HARQ buffer; acquiring the uplink synchronization through the random access; when the terminal device starts the random access before the first moment and continues the random access after the first moment, resetting the first counter associated with the random access, and incrementing the first counter by one counting unit, or remaining the first counter unchanged; when the terminal device starts the random access before the first moment and continues the random access after the first moment, performing the downlink synchronization in response to downlink asynchronization; and/or re-selecting the random access resource according to the signal quality of the changed satellite; using the K offset configured by the changed satellite or the K offset with a value of 0; resetting the second counter associated with RLM; and stopping the first timer associated with RLM.

In some embodiments, the third operation is performed at a moment later than or equal to the first moment.

In some embodiments, the effective moment of the ephemeris information of the changed satellite is earlier than or equal to the first moment.

Figure 14:
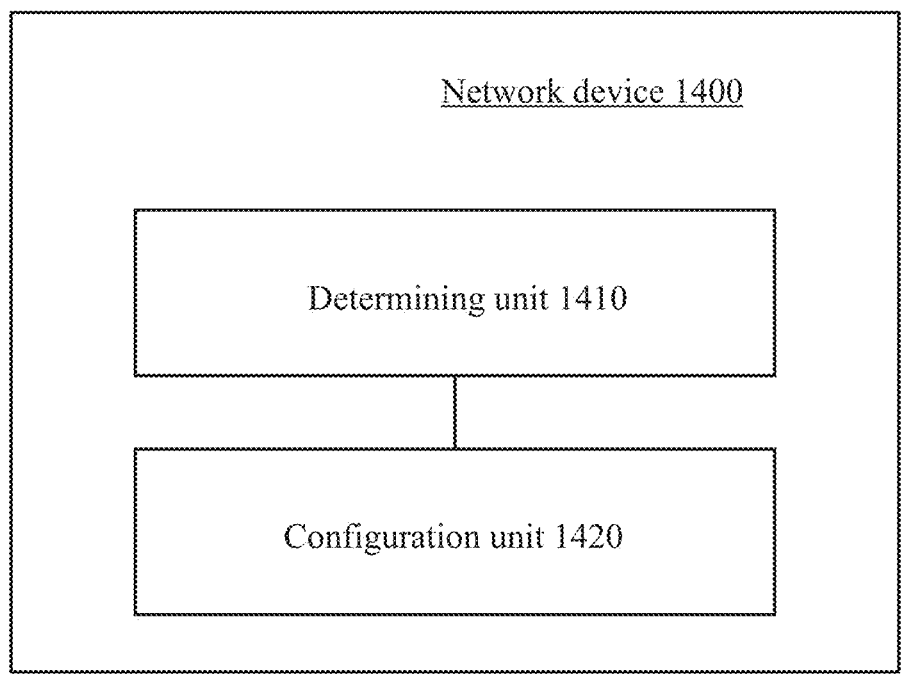
FIG. 14 is a schematic diagram illustrating a structure of a network device in accordance with some embodiments of the present disclosure.

FIG. 14 is a schematic diagram illustrating a structure of a network device 1400 in accordance with some embodiments of the present disclosure. The network device 1400 may include a determining unit 1410 and a configuration unit 1420.

The determining unit 1410 is configured to determine a first moment, the first moment refers to a moment of a change of a satellite corresponding to a first cell for the terminal device.

The configuration unit 1420 is configured to configure one or more of the following information according to the first moment: ephemeris information of a changed satellite, and a first operation performed by the terminal device according to the first moment. The first operation includes one or more of the following operations: a second operation performed by the terminal device after the terminal device starts to use the ephemeris information of the changed satellite; and a third operation performed by the terminal device in response to the change of the satellite corresponding to the first cell.

In some embodiments, the network device is further configured to: transmit first ephemeris information and first indication information. The first indication information is configured to indicate whether the first ephemeris information corresponds to the changed satellite.

In some embodiments, the first indication information is configured to be carried by a first message, and the first message does not include the first indication information in response to the terminal device not receiving indication information at the first moment.

In some embodiments, the network device is further configured to transmit the first ephemeris information. An effective moment of the first ephemeris information is a second moment, and whether the first ephemeris information corresponds to the changed satellite or not is determined based on the second moment.

In some embodiments, when a difference between the second moment and the first moment is less than or equal to a first time threshold, the first ephemeris information corresponds to the changed satellite; or, when the second moment is later than or equal to the first moment, the first ephemeris information corresponds to the changed satellite.

In some embodiments, the network device is further configured to transmit second indication information. The second indication information is configured to indicate that a satellite corresponding to a first neighboring cell for the terminal device is going to become the satellite corresponding to the first cell.

In some embodiments, ephemeris information of a first neighboring cell occupies a first position in an ephemeris information list, and whether the satellite corresponding to the first neighboring cell for the terminal device is going to become the satellite corresponding to the first cell or not is determined based on the first position.

In some embodiments, in response to the first position being a N-th position in the ephemeris information list for one or more neighboring cells, the satellite corresponding to the first neighboring cell is going to become the satellite corresponding to the first cell, where N is a positive integer.

In some embodiments, the network device is further configured to transmit first configuration information. The first configuration information is configured to control whether the terminal device performs the third operation.

In some embodiments, the first configuration information is configured to control whether the terminal device performs one or more of the following operations: before the first moment, when the terminal device triggers a first PHR, canceling the triggering of the first PHR; triggering a second PHR; triggering a TA reporting; resetting a power adjustment value to zero; part of or all the operations performed by the terminal device after a timing advance timer (TAT) times out; clearing a HARQ buffer; acquiring an uplink synchronization through the random access; when the terminal device starts the random access before the first moment and continues the random access after the first moment, resetting a first counter associated with the random access, and incrementing the first counter by one counting unit or remaining the first counter unchanged; when the terminal device starts the random access before the first moment and continues the random access after the first moment, performing a downlink synchronization in response to downlink asynchronization; and/or re-selecting a random access resource based on the signal quality of the changed satellite; using the K offset configured by the changed satellite or the K offset with a value of 0; resetting a second counter associated with the RLM; and stopping a first timer associated with the RLM.

In some embodiments, the third operation is performed at a moment later than or equal to the first moment.

In some embodiments, an effective moment of the ephemeris information of the changed satellite is earlier than or equal to the first moment.

In some embodiments, each of the performing unit 1310, the determining unit 1410, and the configuration unit 1420 may be a processor 1510. The terminal device 1300 or the network device 1400 may further include a memory 1520 and/or a transceiver 1530, as shown in FIG. 15.

Figure 15:
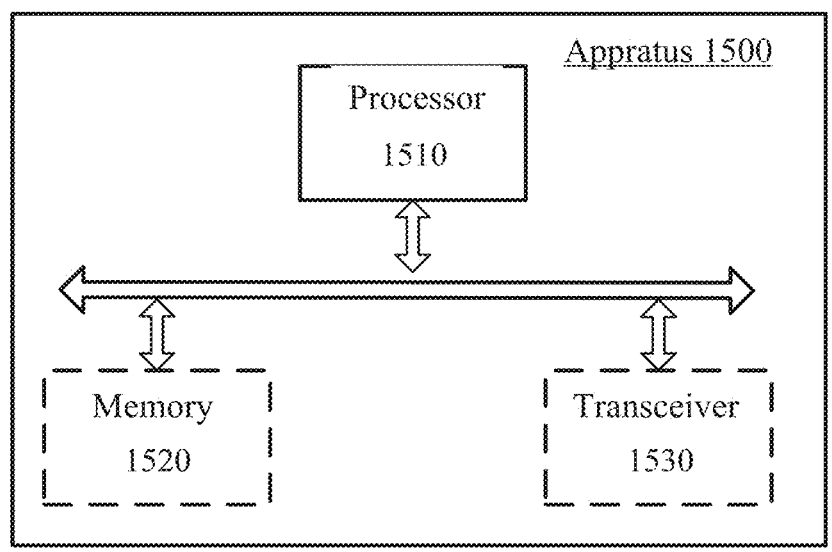
FIG. 15 is a schematic diagram illustrating a structure of an apparatus for communication in accordance with some embodiments of the present disclosure.

FIG. 15 is a schematic diagram illustrating a structure of an apparatus for communication in accordance with some embodiments of the present disclosure. The dashed lines in FIG. 15 indicate that the units or modules are optional. The apparatus 1500 may be configured to implement the methods as described in the foregoing method embodiments. The apparatus 1500 may be a chip, a terminal device, or a network device.

The apparatus 1500 may include one or more processors 1510. The one or more processors 1510 may allow the apparatus 1500 to implement the methods as described in the foregoing method embodiments. The one or more processors 1510 may be one or more general-purpose processors or dedicated processors. For example, the one or more processors may be one or more central processing units (CPUs). Alternatively, the one or more processors may be other general-purpose processors, digital signal processors (DSPs), application-specific integrated circuits (ASICs), field-programmable gate arrays (FPGAs) or other programmable logic devices, discrete gates or transistor logic devices, or discrete hardware components, or the like. The general-purpose processors may be microprocessors, or any conventional processors, or the like.

The apparatus 1500 may further include one or more memories 1520. The one or more memories 1520 store programs that may be executed by the one or more processors 1510 to cause the one or more processors 1510 to perform the methods as described in the foregoing method embodiments. The one or more memories 1520 may be independent of the one or more processors 1510 or may be integrated in the one or more processors 1510.

The apparatus 1500 may further include the transceiver 1530. The one or more processors 1510 may communicate with other devices or chips through the transceiver 1530. For example, the one or more processors 1510 may transmit data to and receive data from other devices or chips through the transceiver 1530.

Some embodiments of the present disclosure further provide a computer-readable storage medium configured to store programs. The computer-readable storage medium may be applied to the terminal device or the network device provided in the embodiments of the present disclosure, and the programs cause a computer to perform the methods which are performed by the terminal device or the network device in the embodiments of the present disclosure.

Some embodiments of the present disclosure further provide a computer program product. The computer program product includes programs. The computer program product may be applied to the terminal device or the network device provided in the embodiments of the present disclosure, and the programs cause a computer to perform the methods which are performed by the terminal device or the network device in the embodiments of the present disclosure.

Some embodiments of the present disclosure further provide a computer program. The computer program may be applied to the terminal device or the network device provided in the embodiments of the present disclosure, and the computer program causes a computer to perform the methods which are performed by the terminal device or the network device in the embodiments of the present disclosure.

It should be understood that the terms "system" and "network" in the present disclosure may be used interchangeably. In addition, the terms used in the present disclosure are only used to explain the embodiments of the present disclosure, and are not intended to limit the present disclosure. The terms "first", "second", "third", "fourth", and the like in the description, claims, and drawings of the present disclosure are used to distinguish different objects, rather than to describe a specific order. In addition, the terms "comprise" and "have" and any variations thereof are intended to cover a non-exclusive inclusion.

In the embodiments of the present disclosure, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In the embodiments of the present disclosure, "B corresponding to A" means that B is associated with A, and B may be determined based on A. However, it should also be understood that, determining B based on A does not only mean determining B based only on A, but instead B may be determined based on A and/or other information.

In the embodiments of the present disclosure, the term "corresponding" may mean that there is a direct or indirect correspondence between the two, or may mean that there is an association relationship between the two, or may mean that there is a relationship such as indicating and being indicated, or configuring and being configured.

In the embodiments of the present disclosure, "pre-defined" or "pre-configured" may be implemented by pre-storing corresponding codes, tables, or other forms that may be used to indicate related information in devices (for example, including the terminal device and the network device), and specific implementations thereof are not limited in the present disclosure. For example, pre-defined may refer to defined in protocols.

In the embodiments of the present disclosure, the "protocol" may refer to a standard protocol in the communications field, and may include, for example, an LTE protocol, an NR protocol, and a related protocol applied to a future communications system, which is not limited in the present disclosure.

In the embodiments of the present disclosure, the term "and/or" is merely used to describe an association relationship between associated objects, indicating that there may be three relationships. For example, A and/or B may indicate that: only A exists, both A and B exist, and only B exists. In addition, the character "/" herein generally indicates an "or" relationship between the associated objects.

In the embodiments of present disclosure, the term "including" may refer to direct inclusion or indirect inclusion. Alternatively, the term "including" mentioned in the embodiments of present disclosure may be replaced with "indicating" or "used for determining". For example, A includes B may be replaced with A indicates B or A is used for determining B.

In the embodiments of the present disclosure, sequence numbers of the foregoing processes do not mean execution sequences. The execution sequences of the processes should be determined according to functions and internal logics of the processes, and should not be construed as any limitation on the implementation processes of the embodiments of the present disclosure.

In the embodiments provided in the present disclosure, it should be understood that, the disclosed system, apparatus, and method may be implemented in other manners. For example, the described apparatus embodiments are merely examples. For example, the division of units is merely logical function division and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to an actual need to achieve the objectives of the solutions of the embodiments.

In addition, function units in the embodiments of the present disclosure may be integrated into one processing unit, or each of the units may exist alone physically, or two or more units are integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of the present disclosure are completely or partially generated. The computer may be a general-purpose computer, a dedicated computer, a computer network, or other programmable apparatuses. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center formed by integrating one or more usable medium. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for communication, comprising:
   receiving, by a terminal device, a first message from a base station, wherein the first message indicates whether the first message comprises ephemeris information corresponds to a second satellite, wherein the first message is a radio resource control (RRC) message or a system information block (SIB); and
   performing, by the terminal device, a third operation in response to a change of a satellite corresponding to the base station for the terminal device, wherein the change comprises a change from a first satellite to the second satellite, and wherein the first satellite and the second satellite correspond to the base station, wherein performing the third operation comprises using a K offset with a value of 0 in response to the change of the satellite.

2. The method for communication according to claim 1, wherein ephemeris information of the second satellite comprises an indication of a reference moment.

3. The method for communication according to claim 1, wherein the terminal device stops using ephemeris information of the first satellite before the change.

4. The method for communication according to claim 1, wherein the third operation comprises clearing a hybrid automatic repeat request (HARQ) buffer.

5. The method for communication according to claim 1, wherein the third operation comprises one or more of:
   cancelling a triggering of a first PHR that is triggered prior to the change of the satellite;

triggering a second PHR;
triggering a TA reporting;
resetting a power adjustment value to zero;
performing one or more operations associated with a timing advance timer (TAT) times out;
acquiring an uplink synchronization through a random access;
in response to the terminal device starting a random access before the change of the satellite and continuing the random access after the change of the satellite, resetting a first counter associated with the random access, and incrementing the first counter by one counting unit or keeping the first counter unchanged;
in response to the terminal device starting the random access before the change of the satellite and continuing the random access after the change of the satellite, performing at least one of a downlink synchronization in response to downlink asynchronization or re-selecting a random access resource according to a signal quality of the second satellite;
resetting a second counter associated with a RLM; and
stopping a first timer associated with the RLM.

6. The method for communication according to claim 1, further comprising:
receiving, by the terminal device, first configuration information;
wherein the first configuration information indicates whether the terminal device performs the third operation.

7. A terminal device, comprising:
at least one processor;
one or more non-transitory computer-readable storage media coupled to the at least one processor and storing programming instructions for execution by the at least one processor, wherein the programming instructions, when executed, cause the terminal device to perform steps comprising:
receiving a first message from a base station, wherein the first message indicates whether the first message comprises ephemeris information corresponds to a second satellite, wherein the first message is a radio resource control (RRC) message or a system information block (SIB); and
performing a third operation in response to a change of a satellite corresponding to the base station for the terminal device, wherein the change comprises a change from a first satellite to the second satellite, and wherein the first satellite and the second satellite correspond to the base station, wherein performing the third operation comprises using a K offset with a value of 0 in response to the change of the satellite.

8. The terminal device according to claim 7, wherein ephemeris information of the second satellite comprises an indication of a reference moment.

9. The terminal device according to claim 7, wherein the steps further comprise: stopping using ephemeris information of the first satellite before the change.

10. The terminal device according to claim 7, wherein the third operation comprises clearing a hybrid automatic repeat request (HARQ) buffer.

11. The terminal device according to claim 7, wherein the third operation comprises one or more of:
cancelling a triggering of a first PHR that is triggered prior to the change of the satellite;
triggering a second PHR;
triggering a TA reporting;
resetting a power adjustment value to zero;
performing one or more operations associated with a timing advance timer (TAT) times out;
acquiring an uplink synchronization through a random access;
in response to the terminal device starting a random access before the change of the satellite and continuing the random access after the change of the satellite, resetting a first counter associated with the random access, and incrementing the first counter by one counting unit or keeping the first counter unchanged;
in response to the terminal device starting the random access before the change of the satellite and continuing the random access after the change of the satellite, performing at least one of a downlink synchronization in response to downlink asynchronization or re-selecting a random access resource according to a signal quality of the second satellite;
resetting a second counter associated with a RLM; and
stopping a first timer associated with the RLM.

12. The terminal device according to claim 7, wherein the steps further comprise:
receiving first configuration information;
wherein the first configuration information indicates whether the terminal device performs the third operation.

13. One or more non-transitory computer-readable media storing computer instructions, that when executed by one or more processors, cause a computing device to perform steps comprising:
receiving a first message from a base station, wherein the first message indicates whether the first message comprises ephemeris information corresponds to a second satellite, wherein the first message is a radio resource control (RRC) message or a system information block (SIB); and
performing a third operation in response to a change of a satellite corresponding to the base station for a terminal device, wherein the change comprises a change from a first satellite to the second satellite, and wherein the first satellite and the second satellite correspond to the base station, wherein performing the third operation comprises using a K offset with a value of 0 in response to the change of the satellite.

14. The one or more non-transitory computer-readable media according to claim 13, wherein ephemeris information of the second satellite comprises an indication of a reference moment.

15. The one or more non-transitory computer-readable media according to claim 13, wherein the steps further comprise: stopping using ephemeris information of the first satellite before the change.

16. The one or more non-transitory computer-readable media according to claim 13, wherein the third operation comprises clearing a hybrid automatic repeat request (HARQ) buffer.

17. The one or more non-transitory computer-readable media according to claim 13, wherein the third operation comprises one or more of:
cancelling a triggering of a first PHR that is triggered prior to the change of the satellite;
triggering a second PHR;
triggering a TA reporting;
resetting a power adjustment value to zero;
performing one or more operations associated with a timing advance timer (TAT) times out;
acquiring an uplink synchronization through a random access;

in response to the terminal device starting a random access before the change of the satellite and continuing the random access after the change of the satellite, resetting a first counter associated with the random access, and incrementing the first counter by one counting unit or keeping the first counter unchanged;

in response to the terminal device starting the random access before the change of the satellite and continuing the random access after the change of the satellite, performing at least one of a downlink synchronization in response to downlink asynchronization or re-selecting a random access resource according to a signal quality of the second satellite;

resetting a second counter associated with a RLM; and stopping a first timer associated with the RLM.

18. The one or more non-transitory computer-readable media according to claim 13, wherein the steps further comprise: receiving first configuration information, wherein the first configuration information indicates whether the terminal device performs the third operation.

* * * * *